United States Patent
Maxwell, III (10) Patent No.: US 10,288,081 B1
(45) Date of Patent: May 14, 2019

(54) POWER END FOR A SINGLE-STAGE END SUCTION CENTRIFUGAL PUMP

(71) Applicant: PumpWorks, LLC, Houston, TX (US)

(72) Inventor: James B. Maxwell, III, Houston, TX (US)

(73) Assignee: PumpWorks, LLC, Houston, TX (US)

( * ) Notice: Subject to any disclaimer, the term of this patent is extended or adjusted under 35 U.S.C. 154(b) by 0 days.

(21) Appl. No.: 15/966,250

(22) Filed: Apr. 30, 2018

(51) Int. Cl.
| | |
|---|---|
| F04D 29/06 | (2006.01) |
| F16C 33/66 | (2006.01) |
| F16C 35/07 | (2006.01) |
| F04D 29/40 | (2006.01) |
| F04D 29/046 | (2006.01) |
| F04D 29/02 | (2006.01) |
| F16C 35/077 | (2006.01) |

(52) U.S. Cl.
CPC ............. *F04D 29/06* (2013.01); *F04D 29/02* (2013.01); *F04D 29/046* (2013.01); *F04D 29/40* (2013.01); *F16C 33/6666* (2013.01); *F16C 35/077* (2013.01)

(58) Field of Classification Search
CPC .... F16C 33/6666; F16C 35/06; F16C 35/067; F16C 35/07; F16C 35/077; F04D 29/06; F04D 29/02; F04D 29/046; F04D 29/40
See application file for complete search history.

(56) References Cited

U.S. PATENT DOCUMENTS

| | | |
|---|---|---|
| 1,865,088 A | 8/1926 | Daun et al. |
| 2,165,658 A | 7/1939 | Schaeren |
| 2,845,141 A | 7/1958 | Mauck et al. |
| 3,180,270 A | 4/1965 | Arnts et al. |
| 3,612,631 A * | 10/1971 | O'Connor ........... F16C 33/6662 384/468 |
| 4,073,596 A * | 2/1978 | Erickson ................... F04D 1/12 415/112 |
| 4,466,508 A * | 8/1984 | Buse ......................... F16N 7/26 184/13.1 |
| 4,741,303 A | 5/1988 | Kronich |
| 4,746,269 A | 5/1988 | Raab |
| 5,000,587 A * | 3/1991 | Hawley ................... F16D 3/841 277/351 |
| 5,207,512 A * | 5/1993 | Grant ..................... F16C 23/086 384/464 |
| 5,499,901 A * | 3/1996 | Rockwood ............ F04D 29/061 277/412 |
| 5,513,964 A * | 5/1996 | Rockwood ............ F16C 33/664 415/175 |
| 5,591,020 A * | 1/1997 | Rockwood ............... B05D 7/00 184/11.2 |

(Continued)

FOREIGN PATENT DOCUMENTS

| | | |
|---|---|---|
| EP | 0224740 A1 | 6/1987 |
| GB | 2433559 B | 6/2011 |

OTHER PUBLICATIONS

Heinz P Bloch, Black oil and bearing housing upgrades, PUmp Industry, pumpindustry.com, Apr. 16, 2013, 8 pages.

(Continued)

*Primary Examiner* — Alan B Waits
(74) *Attorney, Agent, or Firm* — James E. Hudson, III; Crain, Caton & James, P.C.

(57) ABSTRACT

An improved power end for a single-stage end suction centrifugal pump having a seated environment and improved lifespan.

18 Claims, 5 Drawing Sheets

(56) References Cited

U.S. PATENT DOCUMENTS

| | | | | |
|---|---|---|---|---|
| 5,638,796 | A * | 6/1997 | Adams, III | F02B 33/40 123/565 |
| 5,642,944 | A * | 7/1997 | Dublin, Jr. | B61F 15/12 384/102 |
| 5,647,735 | A * | 7/1997 | Rockwood | F16C 33/664 184/11.2 |
| 5,904,356 | A * | 5/1999 | Mundy | F01D 11/003 277/417 |
| 5,908,249 | A | 6/1999 | Nisley et al. | |
| 6,008,557 | A | 12/1999 | Dornhoefer et al. | |
| 6,082,907 | A * | 7/2000 | Arvidsson | F16C 19/36 384/556 |
| 6,331,823 | B1 * | 12/2001 | El-Ibiary | F16C 19/52 340/682 |
| 6,460,656 | B1 * | 10/2002 | Jones, Jr. | F16C 33/664 184/11.1 |
| 7,059,443 | B2 | 6/2006 | Kira | |
| RE39,217 | E | 8/2006 | Rockwood | |
| 7,654,251 | B2 | 2/2010 | Jones et al. | |
| 7,748,951 | B2 | 7/2010 | Visintainer | |
| 8,242,651 | B2 | 8/2012 | Singhal | |
| 9,212,700 | B1 | 12/2015 | Bucking et al. | |
| 2002/0170781 | A1 | 11/2002 | Burkholder | |
| 2006/0054415 | A1 | 3/2006 | Buhlmaier | |
| 2006/0098909 | A1 * | 5/2006 | Hojo | F16C 25/083 384/563 |
| 2010/0175377 | A1 | 7/2010 | Hippen et al. | |
| 2010/0285890 | A1 * | 11/2010 | Dougherty | B60B 27/001 464/137 |
| 2011/0293404 | A1 * | 12/2011 | Hamad | F03B 11/06 415/118 |
| 2012/0049665 | A1 * | 3/2012 | Garriga | H02K 5/20 310/54 |
| 2013/0071266 | A1 * | 3/2013 | Adaniya | F04C 23/008 417/410.1 |
| 2015/0125263 | A1 | 5/2015 | Grabowska | |
| 2015/0337850 | A1 * | 11/2015 | An | F02B 39/00 60/605.3 |
| 2015/0362061 | A1 * | 12/2015 | Nagai | F16C 37/007 74/424.82 |
| 2016/0061202 | A1 | 3/2016 | Duong et al. | |
| 2016/0365769 | A1 * | 12/2016 | Raczek | H02K 5/1732 |
| 2017/0276176 | A1 | 9/2017 | Hirata et al. | |
| 2018/0148845 | A1 * | 5/2018 | Kuhn | C03C 8/14 |

OTHER PUBLICATIONS

Heinz P. Bloch, Pump User's Handbook—Life Extension, Fourth Edition, 2014, 2 pages, Fairmont Press.

New innovation in oil bath lubrication, MRO Machine and Equipment, 1 page, mromagazine.com, Nov. 2017.

* cited by examiner

POWER END FOR A SINGLE-STAGE END SUCTION CENTRIFUGAL PUMP

CROSS-REFERENCE TO RELATED APPLICATIONS

None.

STATEMENT REGARDING FEDERALLY SPONSORED RESEARCH OR DEVELOPMENT

Not Applicable.

BACKGROUND

FIELD

The present disclosure relates generally to pumps for moving fluids. More particularly, the present disclosure is directed to an improved power end for a single-stage end suction centrifugal pump having a sealed environment and improved lifespan.

DESCRIPTION OF THE RELATED ART

Single-stage end suction centrifugal pumps are well known and used in various applications. Each manufacturer can elect various design elements, including interface and dimensions. In an effort to provide standardization and the associated design benefits, the American National Standards Institute (ANSI) promulgated the ANSI B73.1 standard for horizontal, single-stage end suction centrifugal pumps. These pumps uniformly include a back pull out, so the casing can remain while the rest of the pump is removed, and an overhung impeller, where the bearings are at one end and the impeller is at the other. Compliant pumps are identified as "ANSI pumps." ANSI pumps confirm across manufacturers and therefore permit purchasers to replace pumps and brands without the need to change or redesign related components, such as the motor attachment, the coupling, piping location, or bedplate dimensions. ANSI pumps have found uses within various industries including food processing, refineries, and process plant applications. Material selections within the ANSI B73.1 standard are made to ensure optimum performance, such as durability of the pump seal and impeller to the fluid pumped. While these pump connections and dimensions remain constant, pumps vary in design, operation, and performance, including in selection of materials and components. These pumps also use only the internal sump for heat transfer, and are highly inefficient due to a lack of fins, and usually provide a 1:1 inner-to-outer surface area ratio and have a low heat transfer rate.

Such pumps include a casing with input and output flow lines, encapsulating an impeller, where the impeller is connected to a rotating shaft a power end, where the casing is sealed to the power end, and where the power end has an internal sump to provide lubricating fluid and a vent to permit exit of the adjacent heated air. Current pumps in the ANSI market (B73.1) are all lubricated by "oil bath". This lubrication technique involves a higher oil level that submerges part of the ball bearings in the oil resulting in higher operating temperatures and shorter oil life.

Because the operation of the pump results in heating within the power end, the air above the sump expands and must be released to avoid exceeding the pressure limitations of internal components and seals. These air outlets often are protected to reduce the introduction of contaminants, such as insects or cleaning agents. When the pump ceases operation and begins to cool, the internal air volume likewise cools and contracts, drawing air into the pump. In many environments, the surrounding air contains moisture and particulates. To address the associated contamination of the lubricating fluid in the sump, pumps require regular and frequent changes of lubricating fluid.

These systems, however, limit the rate of heat exchange from the power end of the pump and require regular, frequent downtime for service, particularly replacement of the lubricating fluid and ser ricing of the pump components. Current power end design requires oil changes at 6 to 12 months depending on oil type selected by user.

It would therethre be an improvement to provide a power end which avoids the need for frequent downtime for service and which does not require an annual oil change.

SUMMARY

The present disclosure therethre meets the above needs and overcomes one or more deficiencies in the prior art by providing a horizontal pump with a power end having a sealed heat-conductive housing about the rotatable shaft having an internal cavity and having a flinger disc affixed to the rotatable shaft. The heat-conductive housing has an internal cavity with an internal cavity inboard end and an internal cavity outboard end. The internal cavity further has an internal cavity upper section and an internal cavity lower section. The internal cavity lower section is below the rotatable shaft, the lower portion of a first bearing outer race inner surface, and the lower portion of a second bearing outer race inner surface. The flinger disc has a flinger disc outer radius greater than outer race inner radius of the first bearing outer race and of the second bearing outer race and extends into the internal cavity lower section so that a volume of lubricant can momentarily adhere to the surface of the rotating flinger disc. This volume has insufficient adhesion to the flinger disc to overcome the centrifugal force at the flinger disc edge and is cast onto the internal cavity upper section. Beneficially, some of the sprayed volume of lubricant adheres to the surfbce of the internal cavity upper section, and sheds any stored heat to through the heat-conductive housing. In some embodiments, the heat-conductive housing may be sealed against the external environment, having no vent.

The present disclosure provides a power end for a pump which can operate for up to 60 months without changing of the lubricating oil, saving maintenance and oil costs. The present disclosure uses an oil spraying device combined with a lower oil level, such that the bearings are not submerged and the flinger device sprays oil droplets into the bearing components. Further, the spraying of oil onto the inner walls of the powerframe housing increases contact of the lubricating with the cooler inner wall surface and facilitates heat transfer and reduces the potential heat soak in the lubricating oil. Maintaining a lower oil temperature reduces degradation of the lubricating oil and of the lubricated bearings, increasing the lifespan of each.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

Figure 1:
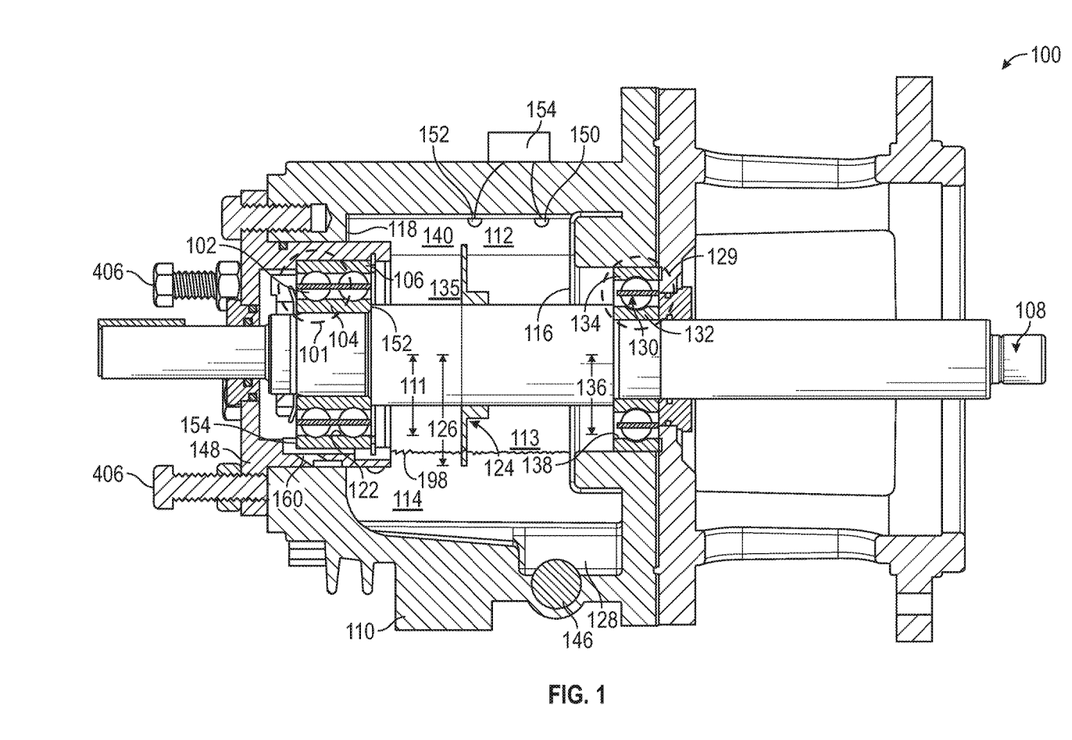
FIG. 1 provides an illustration of a cross-sectional view of the present disclosure.

Referring to FIG. 1, an illustration of a cross-sectional view of the present disclosure is provided. A power end 100 for a pump is provided having a first bearing assembly 101, a second bearing assemble 129, a heat-conductive housing 110, an internal cavity 113, a flinger disc 124. The heat-conductive housing 110 may be constructed of carbon steel to provide an improved heat transfer rate, greater strength and resistance to fracture, but which has not been previously used due to cost issues.

The first bearing assembly 101 may include one or more first bearings 102, a first bearing inner race 104 and a first bearing outer race 106 about a rotatable shaft 108. The first bearing inner race 104 contacts the rotatable shaft 108 and the first bearing outer race 106 to maintain the position of the rotatable shaft 108 and to permit its rotation. The first bearing inner race 104 and the first bearing outer race 106 thus are coaxial to the rotatable shaft 108. The first bearing assembly 101, the outboard bearing, may be a thrust bearing to handle radial loads and the axial loads hydraulically generated. The first bearing outer race 106 may be trapped between the heat-conductive housing 110 and a snap ring. The first bearing outer race 106 has a first bearing outer race inner radius 111 and an outer race inner surface 122.

Similarly, the second bearing assembly 129 may include a second bearing 130, a second bearing inner race 132 and a second bearing outer race 134 about the rotatable shaft 108. The second hearing inner race 132 contacts the rotatable shaft 108 and the second bearing outer race 134 to maintain the position of the rotatable shaft 108 and to permit its rotation. The second bearing inner race 132 and the second bearing outer race 134 thus are coaxial to the rotatable shaft 108. The second bearing assembly 129, the inboard bearing, may comprise a single row of bearings, to handle radial loads, i.e., a radial bearing, positioned to float rather than be trapped. The second bearing outer race 134 likewise has a second bearing outer race inner radius 136 and, at the second bearing outer race inner radius 136, an outer race inner surface 138.

Figure 4:
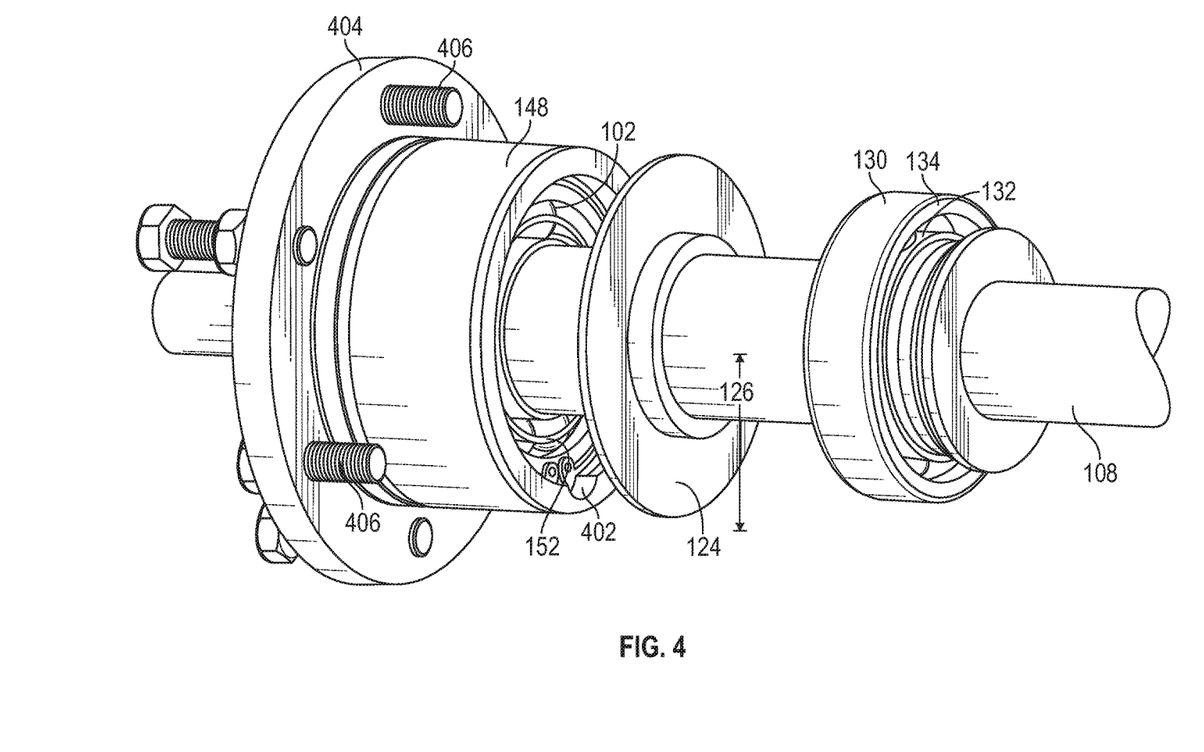
FIG. 4 provides an isometric view of a flinger disc and surrounding components.

The first bearing outer race 106 may be maintained in the internal cavity 113 of the heat-conductive housing 110 in position relative to the heat-conductive housing 110 in a bearing housing 148. The first hearing assembly 101 may have a first bearing first face 152 exposed to the internal cavity 113 and a first bearing second face 154 opposite the first bearing first face 152. The bearing housing 148 may have a downwardly depending draining slot 160 adjacent the first bearing second face 154 and intermediate the first bearing outer race 106 and the internal cavity lower section 114 and below the rotatable shaft 108. Referring to FIG. 4, an isometric view of a flinger disc 124 and surrounding components, a second draining slot 402 is provided on the bearing housing 148 adjacent the first bearing first face 154 and intermediate the first bearing outer race 106 and the internal cavity lower section 114 and below the rotatable shaft 108. Referring again to FIG. 1, with such a construction, bearing housing 148 may be keyed positionally to the heat conducting housing 110. Such as key may be advantageous as lubricant will accumulate on first bearing assembly 101 on the first bearing second face 154. Draining slot 160 and second draining slot 402 permit any lubricant accumulation to return to the internal cavity lower section 114.

Figure 5:
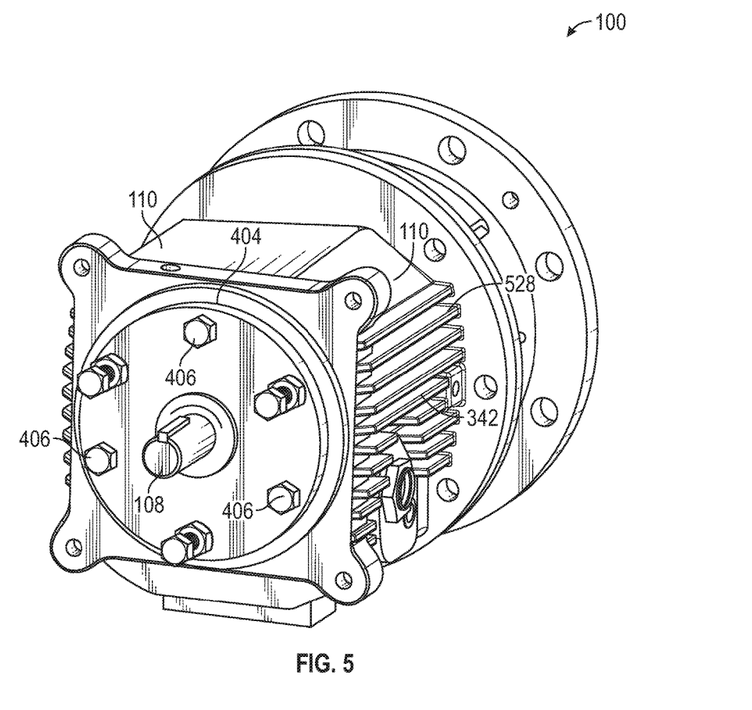
FIG. 5 provides an isometric view of the power end of a pump.

Referring to FIGS. 1 and 4, the draining slot 160 and the second draining slot 402 must be positioned as provided to function. The draining slot 160 and the second draining slot 402 are integrated into the bearing frame end cap 404, which attaches to the heat-conductive housing 110. In the prior art, where the bearing frame end cap and the housing were connected using three, equally-space bolts, the word "TOP" was cast or etched into a bearing frame end cap to identify the proper installation, though not always followed. Referring to FIGS. 4 and 5, to preclude misalignment of the draining slot 160 and the second draining slot 402, the present disclosure uses eccentrically-spaced bolts 406 through the bearing frame end cap 404 to eliminate the potential for user error.

Referring again to FIG. 1, the power end 100 includes a heat-conductive housing 110 positioned about the rotatable shaft 108 and having an internal cavity 113 and surrounding a portion of the rotatable shaft 108. The heat conductive housing 110 is distant and separated from the rotatable shaft 108 by a gap, such that the rotatable shaft 108 penetrates the internal cavity 113 without contacting the heat conductive housing 110 itself. The thickness of the heat-conductive housing 110 is a result of its external dimensions and those of the internal cavity 113. The heat-conductive housing 110 may be constructed of carbon steel or other material intended to conduct heat at operating temperatures without substantial degradation. The internal cavity 113 is defined, in part, by an internal cavity inboard end 116 and an internal cavity outboard end 118.

While the prior art uses isolators, the present disclosure provides mechanical sealing about the rotatable shaft 108, such that seal is formed at the rotatable shaft 108 and the heat conductive housing 110. Other designs have used labyrinth type isolators or lip seals to control contaminant ingestion into the frame environment. Isolators do not hold back pressure increases, due to the lack of a pressure seal, instead permitting free breathing. The internal cavity inboard end 116 and the internal cavity 113 are sealed about and against the rotatable shaft 108 at the internal cavity outboard end 118. The first bearing inner race 104 and the second bearing inner race 132 are affixed to the rotatable shaft 108 within the internal cavity 113 of the heat-conductive housing 110. The second bearing outer race 134 is maintained in the internal cavity 113 of the heat-conductive housing 110 in position relative to the heat-conductive housing 110. The internal cavity 113 is further defined by having an internal cavity upper section 112 and an internal cavity lower section 114. The internal cavity lower section 114 is found below the rotatable shaft 108 and the first bearing outer race inner surface 122, below the rotatable shaft 108, and below the second bearing outer race inner surface 138. The internal cavity upper section 112 is found above the internal cavity lower section, such that the first bearing 102 and the second bearing 130 are found in the internal cavity upper section 112. Where desired, the internal cavity upper section 112 of the heat-conductive housing 110 may further include an enamel coating 135 on an internal cavity upper section inner surface 140. Similarly, the internal cavity 113 may include an enamel coating 135 on an internal cavity upper section inner surface 140. Enamel provides an inorganic, coating to form a mechanical and chemical bond to the metal substrate which provides a coating which is hard, scratch resistant, heat resistant, resistant to acidic and alkaline fluids, and which therefore is rust-resistant, further extending the life of the heat-conductive housing 110. Moreover, the enamel coating 135 provides a wicking effect to maximize the contact of the lubricant 198 to the internal cavity upper section inner surface 140, and therefore aid in heat transfer from the lubricant 198 to the heat-conductive housing 110.

When desired, the internal cavity 113 may be sealed against an exterior of the heat-conductive housing 110. Thus, the internal cavity 113 may be sealed against an external atmosphere. As a result, the vent associated with the prior art, to accommodate changes in internal pressure due to heating of the air and lubricant within the power end of the pump, and which permits introduction of moist and/or contaminated air, is eliminated.

With a positively-sealed environment, the present disclosure provides a power end 100 which may sustain a pressure increase during operation within the heat-conductive housing 110. Prior attempts in the art to provide a positively-sealed environment have resulted in seal failures due to air expansion within the internal cavity 113 because of temperature rise, or because of the use of expensive, but failure-prone, accumulators to control the air expansion and thus lower the air pressure on the mechanical seals.

The use of mechanical seals at each end of the internal cavity 113 provides a seal of the heat-conductive housing 110, i.e., a powerframe. In operation, when the pressure of the internal cavity 113 rises in response to higher temperatures from the heat generated in the bearings and absorbed into the lubricant, the power end 100 remains sealed and permits a higher pressure range than the power ends of pumps known in the art. In the present disclosure, the limitations of the prior art have been overcome by the increased heat transfer made possible by the flinger disc 124 and the heat-conductive housing 110, resulting in lower operating temperatures, less air expansion, and less pressure on the mechanical seals.

The flinger disc 124 is affixed to the rotatable shaft 108 within the internal cavity 113 of the heat-conductive housing 110 above the internal cavity lower section 114 and has a flinger disc outer radius 126 greater than the outer race inner radius 111. As a result, the flinger disc 124 extends into the internal cavity lower section 114. In one embodiment, the flinger disc 124 extends 0.625 inches into the internal cavity lower section 114. In all embodiments, when the internal cavity lower section 114 is filled with lubricant 198, the flinger disc 124 contacts the lubricant 198 at its external surface 196.

When the power end 100 of the operates, the rotatable shaft 108, connected to an impeller, rotates and thus causes rotation of the flinger disc 12.4, causing lubricant 198 to be cast onto the heat-conductive housing 110 in the internal cavity upper section 112 at its internal surface 194 and onto the first bearing 102 and the second hearing 130. The lubricant 198 provides lubrication to the first hearing 102 and the second bearing 130 and absorbs heat from the bearings before draining back to the internal cavity lower section 114. Further, the lubricant 198 sheds heat to the heat-conductive housing 110 in the internal cavity upper section 112, reducing the heating introduced from the first bearing 102 and the second bearing 130. The flinger disc 124 creates a fine mist of lubricant 198, adhering to and rolling down the internal cavity upper section 112 at its internal surface 194 to the internal cavity lower section 114, which induces cooling as heat is absorbed by the heat-conductive housing 110. The heat-conductive housing 110 may have an external surface area 142, of which the external surface area of the internal cavity lower section 114 may be at least 50% and potentially at least 300%, greater than an internal surface area of the internal cavity lower section 114. This outer surface area may be increased by the incorporation of fins 528 to function as passive heat exchangers. This internal cavity lower section 114 may be considered a sump. The internal cavity lower section 114 may include a debris capture basin 128 at its lowermost, having sufficient depth and area to permit particles heavier than the lubricant 198, such as metal filings, to settle in the debris capture basin 128 with limited potential for sufficient flow to induce those heavier particles back into the balance of the internal cavity lower section 114. Where desired, a magnetic 144 may be positioned in the internal cavity lower section 114 and more particularly in the debris capture basin to enhance the likelihood of removal of metal particles from flow in the lubricant 198 and to preclude recirculation of metal particles. The drain plug 146 may be positioned to communicate with the internal cavity lower section 114 at the debris capture basin 128 to encourage exiting of any particles upon maintenance.

When desired, monitoring of operational conditions may be included. One or more thermocouples 150 may be positioned on or adjacent to any of the aforementioned components and may transmit data by wire or may be in communication with a wireless transmitter. Similarly, one or more accelerometers 152 may be positioned on or adjacent to any of the aforementioned components and may transmit data by wire or may be in communication with a wireless transmitter 154.

Figure 2:
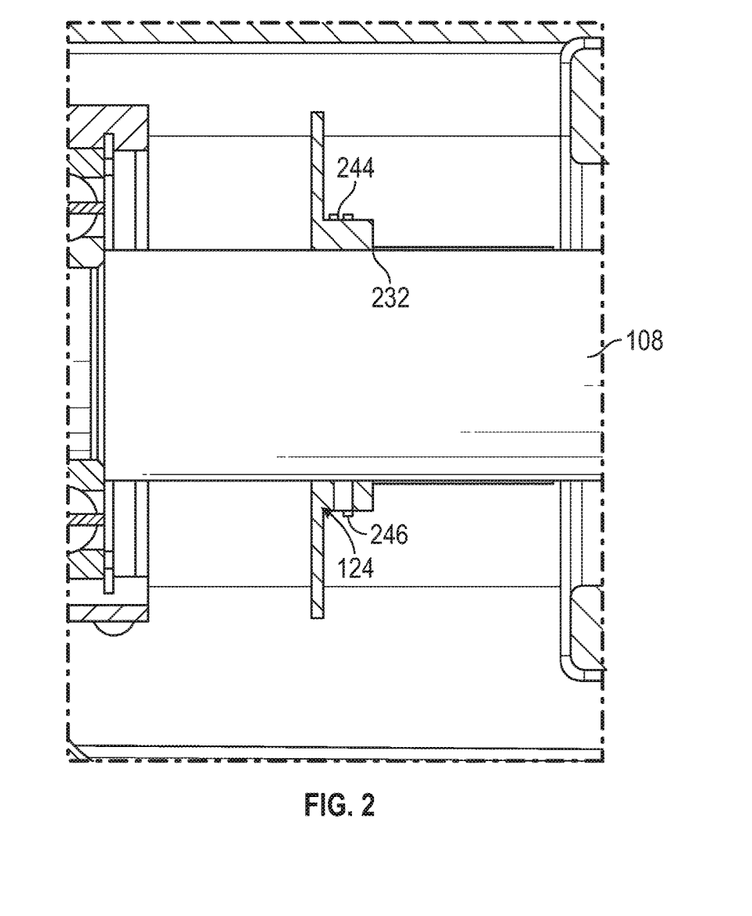
FIG. 2 provides an illustration of a cross-sectional view of a flinger disc of the present disclosure.

Referring to FIG. 2, an illustration is provided of a cross-sectional view of a flinger disc 124 of the present disclosure. In one embodiment, the flinger disc 124 may be affixed to the rotatable shaft 108 with a slip fit and maintained in position with a first set screw 244 and a second set screw 246. Additionally, the rotatable shaft 108 may have a shoulder 232 between the internal cavity inboard end 116 and the internal cavity outboard end 118, so that the flinger disc 124 may be affixed to the rotatable shaft 108 with a slip fit at the shoulder 232. Beneficially, the shoulder 232 promotes proper axial placement of the flinger disc 124 incident to maintenance, as the shoulder 232 precludes placement elsewhere.

Figure 3:
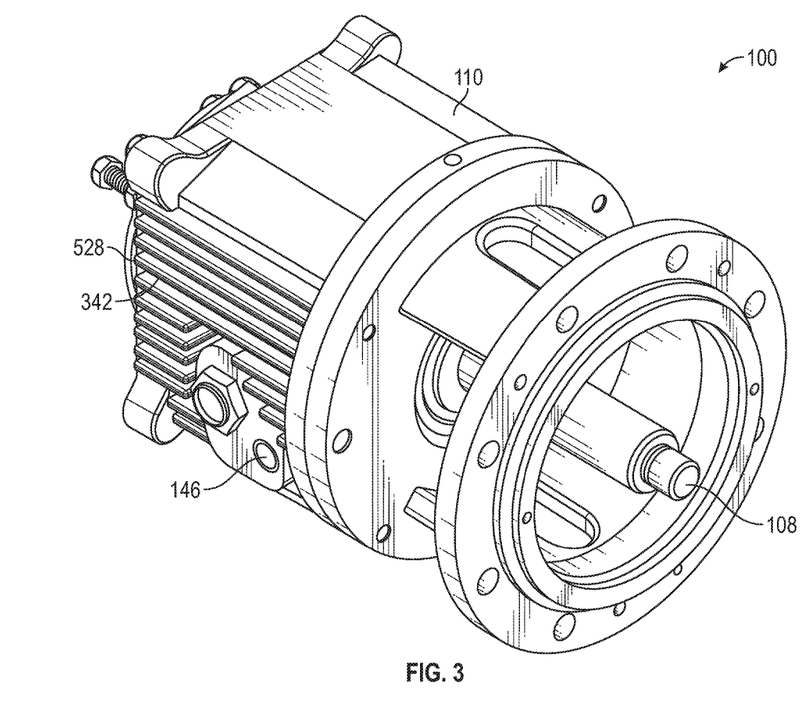
FIG. 3 provides an isometric view of the assembled power end of the pump.

Referring to FIG. 3, an isometric view of the assembled power end 100 of a pump is provided. Where desired, the heat-conductive housing 110 may have an external surface area 342, such that the external surface area about or surrounding the internal cavity lower section 114 is at least 50%, and may be at least 300%, greater than the internal surface area of the internal cavity lower section 114. Similarly, the heat-conductive housing 110 may have an external surface area 342, such that the external surface area about or surrounding the internal cavity upper section 112 is at least 50%, and may be at least 250%, greater than the internal surface area of the internal cavity upper section 112.

The power end 100 of the pump thus may provide a sealed environment precluding the introduction of foreign contaminants and more effectively sheddin heat through the contact of the lubricant 198 to the heat-conductive housing 110 induced by the flinger disc 124. The lubricant 198 is thus subjected to less heat and not mixed with moist, contaminated air. The improvements result in a power end 100 for a pump requiring less maintenance intensive and permitting greater duration of operation between changes of lubricant 198.

The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

I claim:

1. A power end for a horizontal pump having a first bearing assembly having a first bearing, a first bearing outer race, and a first bearing inner race,
the first bearing between the first hearing inner race and the first bearing outer race about a rotatable shaft,
the first bearing outer race having a first bearing outer race inner radius, the first bearing outer race having an outer race inner surface, and
a second hearing assembly having a second bearing, a second bearing outer race, and a second bearing inner race,
the second bearing between the second bearing inner race and the second bearing outer race about the rotatable shaft,
the second bearing outer race having a second bearing outer race inner radius, the second bearing outer race having an outer race inner surface at the second bearing, outer race inner radius;
comprising:
a heat-conductive housing about the rotatable shaft,
the heat-conductive housing having an internal cavity,
the internal cavity having an internal cavity inboard end and an internal cavity outboard end,
the internal cavity positively sealed about the rotatble shaft at the internal cavity inboard end and the internal cavity sealed about the rotatble shaft at the internal cavity outboard end,
the first bearing inner race affixed to the rotatable shaft within the internal cavity of the heat-conductive housing,
the second bearing outer race maintained in the internal cavity of the heat-conductive housing in position relative to the heat-conductive housing;
the internal cavity having an internal cavity upper section and an internal cavity lower section,
the internal cavity lower section below the rotatable shaft and the first bearing outer race inner surface, and below the rotatable shaft and the second bearing outer race inner surface, and
the internal cavity upper section above the internal cavity lower section, the first bearing and the second bearing being in the internal cavity upper section;
a flinger disc affixed to the rotatable shaft within the internal cavity of the heat-conductive housing above the internal cavity lower section,
the flinger disc having a flinger disc outer radius greater than the outer race inner radius of the first bearing outer race,
the flinger disc extending into the internal cavity lower section; and
wherein the first bearing outer race is maintained in the internal cavity of the heat-conductive housing in position relative to the heat-conductive housing in a bearing housing, the first bearing assembly having a first bearing first face exposed to the internal cavity and a first bearing second face opposite the first bearing first face;
the bearing housing having a downwardly depending draining slot adjacent the first bearing second face and intermediate the first bearing outer race and the internal cavity lower section and below the rotatable shaft; and
wherein the bearing housing is keyed positionally to the heat conducting housing.

2. The power end of claim 1, wherein the flinger disc is affixed to the rotatable shaft with a slip fit and maintained in position with a first set screw and a second set screw.

3. The power end of claim 1, wherein the rotatable shaft has a shoulder between the internal cavity inboard end and the internal cavity outboard end, and the flinger disc is affixed to the rotatable shaft with a slip fit at the shoulder.

4. The power end of claim 1, wherein the heat-conductive housing is constructed of carbon steel.

5. The power end of claim 4, wherein the internal cavity of the heat-conductive housing further includes an enamel coating on an internal cavity upper section inner surface.

6. The power end of claim 5, wherein an external surface area of the heat-conductive housing has an external surface area about the internal cavity lower section having an external surface area at least 300% greater than an internal surface area of the internal cavity lower section.

7. The power end of claim 5, wherein an external surface area of the heat-conductive housing has an external surface area about the internal cavity upper section having an external surface area at least 250% greater than an internal surface area of the internal cavity upper section.

8. The power end of claim 1, wherein the internal cavity upper section of the heat-conductive housing further includes an enamel coating on an internal cavity upper section inner surface.

9. The power end of claim 1, wherein an external surface area of the heat-conductive housing has an external surface area about the internal cavity lower section at least 300% greater than an internal surface area of the internal cavity lower section.

10. The power end of claim 1, wherein an external surface area of the heat-conductive housing has an external surface area about the internal cavity lower section having an external surface area at least 300% greater than an internal surface area of the internal cavity lower section.

11. The power end of claim 1, wherein an external surface area of the heat-conductive housing has an external surface area about the internal cavity upper section having an external surface area at least 250% greater than an internal surface area of the internal cavity upper section.

12. The power end of claim 1, wherein the flinger disc extends 0.625 inches into the internal cavity lower section.

13. The power end of claim 1, wherein the internal cavity is sealed against an exterior of the heat-conductive housing.

14. The power end of claim 1, further comprising a thermocouple in communication with a wireless transmitter.

15. The power end of claim 14, further comprising an accelerometer in communication with a wireless transmitter.

16. The power end of claim 1, further comprising an accelerometer in communication with a wireless transmitter.

17. The powerend of claim 1, wherein the internal cavity is sealed against an external atmosphere.

18. A power end for a horizontal pump having a first bearing assembly having a first bearing a first bearing outer race, and a first bearing inner race, the first bearing inner race contacting a rotatable shaft, the first bearing outer race, the first bearing inner race and the rotatable shaft being coaxial, the first bearing between the first bearing inner race and the first bearing outer race, the first bearing outer race having a first bearing outer race inner radius, the first bearing outer race having an outer race inner surface; and a second bearing assembly having a second bearing, a second bearing outer race, and a second bearing inner race, the second bearing inner race contacting a rotatable shaft, the second bearing outer race, the second bearing inner race and the rotatable shaft being coaxial, the second bearing between the second bearing inner race and the second bearing outer race, the second bearing outer race having a second bearing outer race inner radius, the second bearing outer race having an outer race inner surface at the second bearing outer race inner radius;

comprising:

a heat-conductive housing surrounding a portion of the rotatable shaft and separated from the rotatable shaft by a gap, the rotatable shaft penetrating the heat conductive housing, the heat-conductive housing having an internal cavity,
the internal cavity having an internal cavity inboard end and an internal cavity outboard end,
the internal cavity positively sealed against the rotatable shaft at the internal cavity inboard end and the internal cavity sealed about the rotatable shaft at the internal cavity outboard end, the first bearing inner race affixed to the rotatable shaft within the internal cavity of the heat-conductive housing, the second bearing outer race maintained in the internal cavity of the heat-conduvtive housin in position relative to the heat-conductive housing;

the internal cavit having an internal cavity upper section and an internal cavity lower section,
the internal cavity lower section below the rotatable shaft and the first bearing outer race inner surface, and below the rotatable shaft and the second bearing outer race inner surface, and
the internal cavity upper section above the internal cavity lower section, the first bearing and the second bearing being in the internal cavity upper section;

a flinger disc affixed to the rotatable shaft within the internal cavity of the heat-conductive housing above the internal cavity lower section,
the flinger disc having a flinger disc outer radius greater than the outer race inner radius of the first bearing outer race,
the flinger disc extending into the internal cavity lower section; and wherein the first bearing outer race is maintained in the internal cavity of the heat-conductive housing in position relative to the heat-conductive housing in a bearing housing, the first bearing assembly having a first bearing first face exposed to the internal cavity and a first bearing second face opposite the first bearing first face;

the bearing housing having a downwardly depending draining slot adjacent the first bearing second face and intermediate the first bearing outer race and the internal cavity lower section and below the rotatable shaft; and wherein the bearing housing is keyed positionally to the heat conducting housing.

\* \* \* \* \*

UNITED STATES PATENT AND TRADEMARK OFFICE
CERTIFICATE OF CORRECTION

PATENT NO. : 10,288,081 B1
APPLICATION NO. : 15/966250
DATED : May 14, 2019
INVENTOR(S) : James B. Maxwell

Page 1 of 1

It is certified that error appears in the above-identified patent and that said Letters Patent is hereby corrected as shown below:

In the Specification

In Column 2, Line 20:
"The present disclosure therethre" should read --The present disclosure therefore--

Signed and Sealed this
Third Day of September, 2019

Andrei Iancu
*Director of the United States Patent and Trademark Office*